Patented Oct. 10, 1933

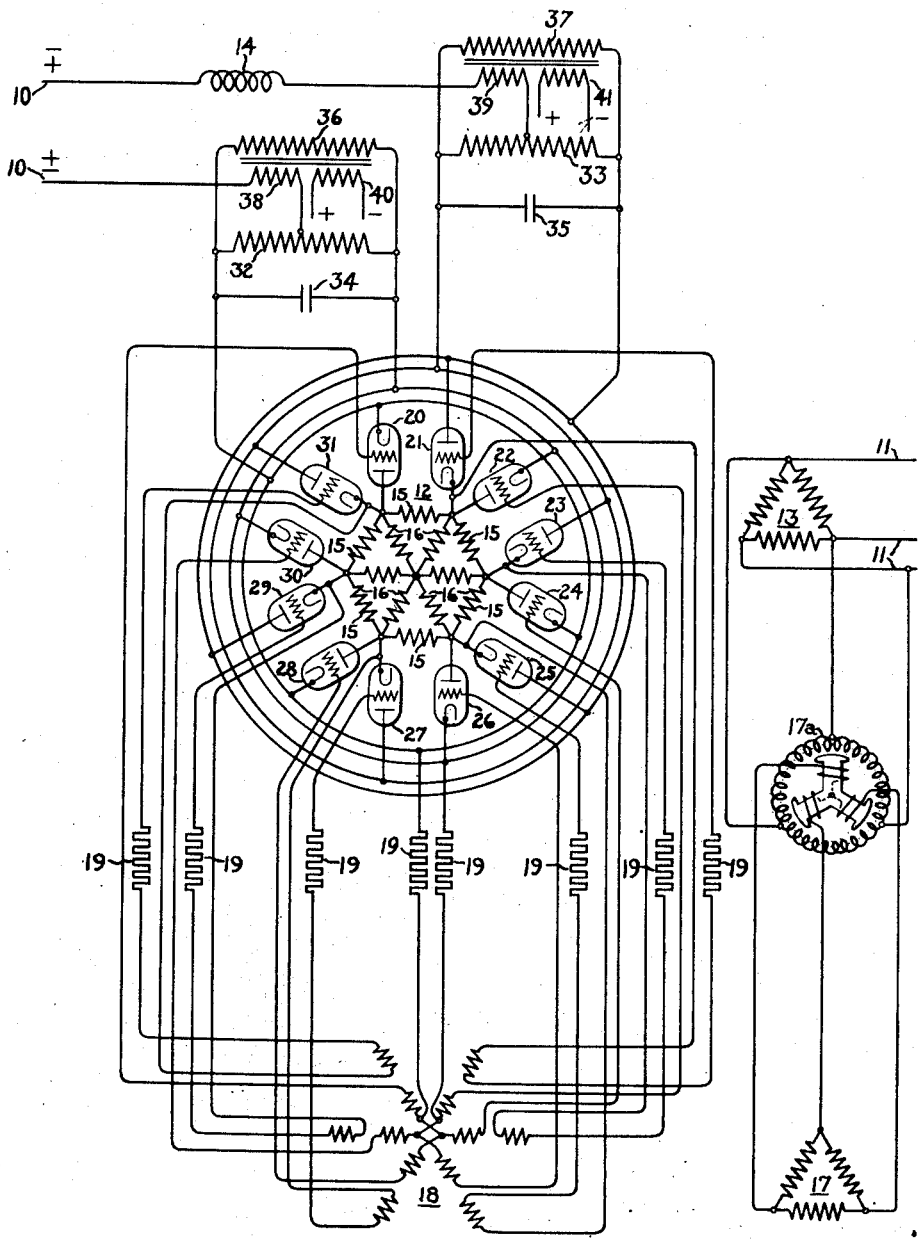

1,929,724

UNITED STATES PATENT OFFICE 1,929,724

ELECTRIC VALVE CONVERTING APPARATUS

Clodius H. Willis, Princeton, N. J., and Curtis W. Lampson, Pittsfield, Mass., assignors to General Electric Company, a corporation of New York Application October 1, 1931. Serial No. 566,370

13 Claims. (Cl. 175—363)

Our invention relates to electric valve converting apparatus and more particularly to such apparatus adapted to transmit energy between direct and alternating current circuits.

Heretofore, there have been devised numerous apparatus including electric valves for transmitting energy between direct and alternating current circuits or alternating current circuits of different frequencies. When operating such apparatus as a rectifier, transmitting energy from an alternating current circuit to a direct current circuit, it has been customary to control the average voltage of the direct current circuit by retarding the phase of the grid potentials of the several electric valves with respect to their anode potentials. The effect of this type of control is to draw a lagging current from the alternating current circuit, while on the other hand it is usually preferable to draw a leading current in order to improve the power factor of the system. In the majority of the arrangements of the prior art, however, it has not been possible to operate such a controlled rectifier at leading power factors, since this type of operation involves the transfer of the load current from one valve to the next succeeding valve in opposition to the electromotive force of the inductive winding interconnecting the valves. On the other hand when operating such apparatus as an inverter, transmitting energy from a direct current circuit to an alternating current circuit, it has not been possible ordinarily to supply lagging loads on the alternating current circuit without the provision of an inordinate amount of commutating capacitance. This is due to the fact that a lagging power factor on the alternating current circuit corresponds to a transfer of load between the several electric valves at points in the cycle of alternating potential when the counter-electromotive force of the inductive winding connected between the valves opposes such commutation. The same principles apply when transmitting energy from an alternating current circuit of one frequency to an alternating current circuit of another frequency or the same frequency. In many cases, however, it is desirable to supply a lagging power factor alternating current load by means of an electric valve converting apparatus.

In the copending applications of C. H. Willis, Serial No. 566,372, Serial No. 566,368, Serial No. 566,367, and Serial No. 566,373, all filed October 1, 1931, and all assigned to the same assignee as the present application, there are disclosed and claimed electric valve converting apparatus which are capable of supplying a lagging load on an alternating current circuit when operating as an inverter, and of drawing leading current from an alternating current circuit when operating as a rectifier. These types of operation are obtained in the arrangements of the above mentioned applications by introducing into the converting system a commutating electromotive force which is a harmonic of that of the alternating current circuit. In certain of the arrangements disclosed in the above mentioned applications, the harmonic commutating electromotive force varies with the load current. In some cases, however, it has been found that such variation imposes a limitation upon the permissible variations in load on the apparatus, very light loads tending to reduce the commutating electromotive force below a satisfactory value and very heavy loads tending to increase the commutating electromotive force to an excessive value. Our present invention constitutes an improvement upon the arrangements disclosed in those applications and relates more specifically to an arrangement for controlling the magnitude of the harmonic commutating electromotive force in accordance with the load on the apparatus, thus widening the range of permissible load variations and improving the operation of the apparatus.

It is an object of our invention to provide an improved electric valve converting apparatus for transmitting energy between direct and alternating current circuits under any desired power factor conditions on the alternating current circuit.

It is another object of our invention to provide an improved electric valve converting apparatus which will operate as a rectifier and draw leading current from an alternating current circuit.

It is a further object of our invention to provide an improved electric power converting apparatus which will operate as an inverter, transmitting energy from a direct current circuit to an alternating current circuit, and which will supply reactive loads of any desired power factor.

It is a further object of our invention to provide an improved electric valve converting apparatus for transmitting energy between direct and alternating current circuits, said apparatus including means for introducing into the converting system a harmonic commutating electromotive force substantially constant in magnitude and variable in phase in accordance with the load current of the apparatus for maintaining any desired power factor conditions on the alternating circuit.

In accordance with our invention, direct and alternating current circuits are interconnected through an inductive winding, or a network of inductive windings, and a plurality of electric valves. The several electric valves are successively rendered alternately conductive and non-conductive and the current is transferred between successive valves under non-unity power factor conditions on the alternating current circuit. At points in the cycle when the fundamental alternating potential of the inductive winding or windings connected between the successive valves opposes commutation, by introducing into the system an alternating potential which is a harmonic of that of the alternating current circuit. By this means the wave form of the potential of the system is distorted so that the desired commutation may be effected at points in the cycle at which this commutation would not ordinarily be possible. In accordance with our present invention the harmonic commutating electromotive force, which normally varies with the load transmitted by the apparatus, is controlled in response to the load on the apparatus to mantain the harmonic commutating electromotive force substantially constant in magnitude and variable in phase in accordance with the load on the apparatus, and thus secure more satisfactory operation of the apparatus.

For a better understanding of our invention together with other and further objects thereof, reference is had to the following description taken in connection with the accompanying drawing, and its scope will be pointed out in the appended claims. The single figure of the accompanying drawing is a diagrammatic representation of our invention as embodied in an apparatus for transmitting energy between a direct current circuit and a three-phase alternating current circuit.

Referring now to the drawing, there is illustrate an arrangement for transmitting energy between a direct current circuit 10 and a three-phase alternating current circuit 11. This apparatus comprises a transformer network 12 connected across the direct current circuit 10 through electric valves 20—31 inc., and an inductively coupled transformer network 13 connected to the polyphase circuit 11. If desired, a smoothing reactor 14 may be connected in the direct current circuit. Electric valves 20—31 inc. are each provided with an anode, a cathode and a control grid and may be of any of the several types well known in the art, although we prefer to use valves of the vapor electric discharge type. The transformer network 12 comprises the six-phase ring or mesh connected windings 15 and the six-phase star-connected windings 16, interconnected with the ring connected windings 15, as illustrated, to form a geometrically rigid network. In case the alternating current circuit 11 is connected to an independent source of electromotive force for determining its frequency and wave form, the grids of electric valves 20—31 inc. may be excited therefrom through any suitable connection. By way of example we have illustrated a grid transformer comprising a primary winding 17 connected to the alternating current circuit 11 through a rotary phase shifting transformer 17a and a six-phase star-connected secondary windings 18 comprising separate insulated phase windings for exciting the several valves or groups of valves having independent cathode potentials. By means of the rotary phase shifting transformer 17a, the point in the cycle of the alternating potential of the circuit 11 at which the current is transferred between the successive valves, and thus the power factor of the energy transmitted by the apparatus, may be readily controlled. In case the alternating current circuit 11 is not connected to an independent source of electromotive force, the rotary phase shifting transformer 17a may be energized from any suitable source of alternating control potential of the desired frequency. The grid transformer including the windings 17 and 18 should be self-saturating, or separate saturating transformers should be interposed between this transformer and the grids of the several electric valves, or some other means of producing grid excitation of peaked wave form should be provided, since each of the valves should be excited for a period somewhat less than 60 electrical degrees. However, this feature of exciting the grids with the potential of peaked wave form forms no part of our present invention but is disclosed and broadly claimed in the co-pending application of B. D. Bedford, Serial Number 485,335, filed September 29, 1930, and assigned to the same assignee as the present application.

In order to commutate the current between the several electric valves under any desired power factor conditions on the alternating current circuit 11, we have provided the commutating windings 32 and 33, each consisting of an auto-transformer provided with an electrical midpoint connected to one side of the direct current circuit 10. The end terminals of the winding 32 are connected to the cathodes of the electric valves whose anodes are connected to alternate terminals of the transformer network 12, while the end terminals of the winding 33 are connected to the anodes of the valves whose cathodes are connected to alternate terminals of the network 12. Connected in parallel with commutating windings 32 and 33 are capacitors 34 and 35 which, because of the high reactance of the windings 32 and 33, are effectively in series with their associated windings but with reversed polarity as the load current is transferred between the opposite halves of the windings. In order to control the magnitude of the harmonic commutating potential supplied by the inductive windings 32 and 33 and their associated capacitors 34 and 35 in accordance with the load on the apparatus, and thus maintain this potential substantially constant, there is connected in parallel to the capacitors 34 and 35 variable reactance devices, either inductive or capacitive, although we have illustrated by way of example saturable reactors 36 and 37 respectively. The saturable reactors 36 and 37 are provided with saturating windings 38 and 39, respectively, connected in series with the direct current and with the saturating windings 40 and 41 respectively, adapted to be energized from a suitable source of constant direct current, as indicated, and connected to oppose the saturating effect of the windings 38 and 39.

Neglecting the harmonic excitation of the system, the general principles of the operation of the above described valve converting apparatus will be well understood by those skilled in the art. When the system is operating as a rectifier, current will flow from the network 12, through one of the valves, for example valve 26, to the lower direct current terminal, which will be positive under these conditions; through the direct current load circuit, completing the circuit through electric valve 31. This current will be successively transferred between adjacent similarly connected valves at the frequency of the alternating current supply circuit, each of the several electric valves being conductive for one-sixth of a cycle. As will be well understood by those skilled in the art, the average voltage of the direct current circuit 10 may be controlled by retarding the grid potentials of the several electric valves by means of the rotary phase shifting transformer 17a, the voltage of the direct current circuit 10 decreasing as the grid potentials are retarded with respect to the anode potentials. As stated above, with this type of voltage control the rectifying apparatus becomes the equivalent of a lagging load on the alternating current circuit, while in most cases it is preferable to draw a leading current from the alternating current circuit to improve the power factor of the system. In the arrangement illustrated, however, neglecting the saturable reactors 36 and 37, it is seen that the capacitors 34 and 35 are effectively in series with the main valve converting apparatus, since, neglecting the magnetizing admittance of the windings 32 and 33, any load current which flows through one-half of these windings must be balanced by an equal and opposite current flowing in the other half and the only path in which these balancing currents can flow is through the capacitors 34 and 35. The result is that during the interval in which one pair of the main electric valves is conducting, the capacitors 34 and 35 become charged to such a polarity as to transfer the load current to the next successive pair of valves when they are rendered conductive. During the next successive interval when the next successive pair of electric valves is conducting, these capacitors become charged to an equal potential of opposite polarity, but, since the connections to the similar valves are also reversed, the polarity is such as to again transfer the load current between the next successive pairs of valves. Since the load current is transferred between the two halves of the commutating windings 32 and 33, for each transfer of current between the adjacent valves of the converting apparatus it is seen that the potential of the capacitors 34 and 35 will reverse the polarity six times for each complete cycle. In other words the potential of the capacitors 34 and 35 will be a third harmonic of the alternating potential of the circuit 11.

Since, as stated above, capacitors 34 and 35 are effectively in series with the valve converting apparatus, it is seen that their potential which is available for commutating the current between the successive valves is directly proportional to the load current. It has been found that, with the apparatus operating under light load conditions, the harmonic commutating potential tends to fall below a satisfactory value. This can, of course, be avoided by decreasing the size of the capacitors 34 and 35, but in that case the capacitors would tend to charge to excessive potentials under heavy load conditions. In the arrangement described, however, in parallel to the reactors 32 and 33 are connected the saturable reactors 36 and 37 respectively which are normally saturated by means of the constantly excited saturating windings 40 and 41. Since the charging circuits of capacitors 34 and 35 each include the smoothing reactor 14, which preferably has an ohmic impedance considerably greater than that of capacitors 34 and 35, in series, at the frequency of the alternating current circuit, the addition of the low reactance of the saturated reactors 36 and 37 decreases the equivalent capacitance of these parallel circuits so that the charging current flowing through the capacitors 34 and 35 produces a larger potential drop across them to supply an adequate harmonic commutating potential. As the load on the apparatus increases, the saturating windings 38 and 39 tend to desaturate the reactors 36 and 37 and thus increase the equivalent capacitance of the parallel circuits including capacitors 34 and 35. Thus, as the load current increases, tending to increase the harmonic commutating potential, the equivalent capacitance of the commutating circuit also increases so that the potentials of these capacitors will not rise to excessive values. By properly selecting the constants of the circuit and the relative number of turns of the windings 38 and 39, and 40 and 41, the harmonic commutating potential may be maintained substantially constant or any desired regulation characteristics may be obtained.

On the other hand, if the system is operating as an inverter, transmitting energy from the direct current circuit 10 to the alternating current circuit 11, current will flow from the upper or positive direct current terminal 10 into one of the electric valves, for example 31, through the transformer network 12 and electric valve 26 to the other side of the direct current circuit. Sixty electrical degrees after valves 31 and 26 have started to conduct current, electric valves 21 and 28 will be made conductive and the current will be transferred to them. In this way the current will be successively commutated between the several electric valves, each pair of valves being conductive for 60 electrical degrees. As stated above, it is not ordinarily possible, with this type of apparatus to supply lagging loads on the alternating current circuit. As in the case of the rectifier, however, the use of the commutating windings 32 and 33 energized with the third harmonic of alternating potential provides an electromotive force opposing that appearing in the network 12 between the adjacent valves, which tends to prevent commutation, thus enabling the current to be commutated between the several electric valves at a later point in the cycle of alternating current and supply a lagging load to the alternating current circuit 11.

While we have illustrated our invention as applied to a six-phase electric valve converting apparatus, it will be well understood by those skilled in the art that it is equally applicable to a single phase system such as that disclosed in the copending application, Serial No. 566,368 referred to above, or to any other polyphase system. It will also be obvious to those skilled in the art that our invention is equally applicable to a half wave electric valve converting apparatus in which case one of the commutating windings is omitted and the corresponding direct current terminal is connected to the neutral of the transformer network 12.

While we have described what we at present consider the preferred embodiment of our invention, it will be obvious to those skilled in the art that various changes and modifications may be made without departing from our invention and we therefore aim in the appended claims to cover all such changes and modifications as fall within the true spirit and scope of our invention.

What we claim as new and desire to secure by Letters Patent of the United States, is:

1. In combination, a direct current circuit, an alternating current circuit, and means for transmitting energy therebetween under any desired power factor conditions on said alternating current circuit comprising an inductive winding in energy transmitting relation with respect to said alternating current circuit, means including a group of similarly disposed electric valves interconnecting said winding with one side of said direct current circuit, and a connection from the other side of the direct current circuit to said winding, means for controlling the conductivity of said valves, impedance means in series relationship with the load current of said apparatus, means for utilizing the potential drop of said impedance means for commutating the current between said valves, and means for varying the impedance of said impedance means in accordance with the load transmitted by the apparatus.

2. In combination, a direct current circuit, an alternating current circuit, and means for transmitting energy therebetween under any desired power factor conditions on said alternating current circuit comprising an inductive winding in energy transmitting relation with respect to said alternating current circuit, means including a group of similarly disposed electric valves interconnecting said winding with one side of said direct current circuit, and a connection from the other side of the direct current circuit to said winding, means for controlling the conductivity of said valves, a capacitive circuit in series relationship with the load current of said apparatus, means for utilizing a potential derived from said capacitive circuit for commutating the current between said valves, and means for varying the equivalent capacitance of said capacitive circuit in accordance with the load transmitted by the apparatus.

3. In combination, a direct current circuit, an alternating current circuit, and means for transmitting energy therebetween under any desired power factor conditions on said alternating current circuit comprising an inductive winding in energy transmitting relation with respect to said alternating current circuit, means including a group of similarly disposed electric valves interconnecting said winding with one side of said direct current circuit, and a connection from the other side of the direct current circuit to said winding, means for controlling the conductivity of said valves, a capacitive and an inductive reactance in series relationship with the load current of said apparatus, means for utilizing the potential drop of one of said reactances for commutating the current between said valves, and means for varying the relative impedances of said reactances in accordance with the load transmitted by the apparatus.

4. In combination, a direct current circuit, an alternating current circuit, and means for transmitting energy therebetween under any desired power factor conditions on said alternating current circuit comprising an inductive winding in energy transmitting relation with respect to said alternating current circuit, means including a group of similarly disposed electric valves interconnecting said winding with one side of said direct current circuit, and a connection from the other side of the direct current circuit to said winding, means for controlling the conductivity of said valves, a capacitor in series relationship with the load current of said apparatus, connections between said capacitor and said valves whereby the potential of said capacitor is effective to commutate the current therebetween, a variable inductive reactance connected in parallel with said capacitor, and means responsive to the load transmitted by said apparatus for varying said reactance.

5. In combination, a direct current circuit, an alternating current circuit, and means for transmitting energy therebetween under any desired power factor conditions on said alternating current circuit comprising an inductive winding in energy transmitting relation with respect to said alternating current circuit, means including a group of similarly disposed electric valves interconnecting said winding from one side of said direct current circuit, and a connection from the other side of the direct current circuit to said winding, means for controlling the conductivity of said valves, mutually coupled inductive windings interposed in the connections between said valves and said direct current circuit, a capacitor in series relationship with said inductive windings, a variable inductive reactance connected in parallel with said capacitor, and means responsive to the load transmitted by said apparatus for varying said reactance.

6. In combination, a direct current circuit, an alternating current circuit, and apparatus for transmitting energy therebetween under any desired power factor conditions on said alternating current circuit comprising an inductive winding in energy transmitting relation with respect to said alternatng current crcuit, means including a group of similarly disposed electric valves interconnecting said winding with one side of said direct current circuit, and a connection from the other side of the direct current circuit to said winding, means for controlling the conductivity of said valves, a second inductive winding interposed in the connections between said valves and said direct current circuit, a commutating capacitor connected in series relationship with said second inductive winding, a saturable reactor in parallel with said capacitor, and means for varying the saturation of said reactor in accordance with the load transmitted by the apparatus.

7. In combination, a direct current circuit, an alternating current circuit, and apparatus for transmitting energy therebetween under any desired power factor conditions on said alternating current circuit comprising a first inductive winding in energy transmitting relation with respect to said alternating current circuit, a group of similarly disposed electric valves connected to said winding, means for controlling the conductivity of said valves, a second inductive winding provided with an electrical midpoint connected to one of said direct current circuits and with end terminals connected to said electric valves, a connection from said first inductive winding to the other side of said direct current circuit, a capacitor connected between said end terminals for commutating the load current between said valves, a variable inductive reactance connected in parallel with said capacitor, and means for varying said reactance in accordance with the load transmitted by the apparatus.

8. In combination, a direct current circuit, an alternating current circuit and apparatus for transmitting energy therebetween under any desired power factor conditions on said alternating current circuit comprising a first inductive winding in energy transmitting relation with respect to said alternating current circuit, a group of similarly disposed electric valves connected to said winding, means for controlling the conductivity of said valves, a second inductive winding provided with an electrical midpoint connected to one side of said direct current circuit and with end terminals connected to said electric valves, a connection from said first inductive winding to the other side of said direct current circuit, to a capacitor connected between said end terminals for commutating the load current between said valves, a smoothing reactor connected in said direct current circuit, said smoothing reactor having a substantially higher ohmic impedance than said capacitor at the frequency of said alternating current circuit, a normally saturated reactor connected in parallel with said capacitor and provided with a desaturating winding energized in accordance with the load current of the apparatus.

9. In combination, a direct current circuit, an alternating current circuit and apparatus for transmitting energy therebetween under any desired power factor conditions on said alternating current circuit comprising a polyphase network of inductive windings and an electric valve connected to each terminal of said network, means for controlling the conductivity of said valves, impedance means in series relationship with the load current of said apparatus, the terminals of said impedance being connected to the electric valves associated with alternate terminals of said network for commutating the current between them, and means for varying the impedance of said impedance means in accordance with the load transmitted by the apparatus.

10. In combination, a direct current circuit, an alternating current circuit and apparatus for transmitting energy therebetween under any desired power factor conditions on said alternating current circuit comprising a polyphase network of inductive windings and an electric valve connected to each terminal of said network, means for controlling the conductivity of said valves, a commutating capacitor in series relationship with the load current of the apparatus and connected between the valves associated with alternate terminals of said network, a saturable reactor connected in parallel with said capacitor, and means for varying the saturation of said reactor in accordance with the load transmitted by said apparatus.

11. In combination, a direct current circuit, an alternating current circuit, and means for transmitting energy therebetween under any desired power factor conditions on said alternating current circuit comprising an inductive winding in energy transmitting relation with respect to said alternating current circuit, means including a group of similarly disposed electric valves interconnecting said winding with one side of said direct current circuit, and a connection from the other side of said direct current circuit to said winding, means for controlling the conductivity of said valves, means for introducing into said apparatus an alternating potential to commutate the current between said valves against the electromotive force of said winding, and means for modifying said commutating potential in response to variations in the load transmitted by said apparatus.

12. In combination, a direct current circuit, an alternating current circuit, and means for transmitting energy therebetween under any desired power factor conditions on said alternating current circuit comprising an inductive winding in energy transmitting relation with respect to said alternating current circuit, means including a group of similarly disposed electric valves interconnecting said winding with one side of said direct current circuit, and a connection from the other side of said direct current circuit to said winding, means for controlling the conductivity of said valves, means for introducing into said apparatus an alternating potential to commutate the current between said valves against the electromotive force of said winding, and adidtional means for regulating the magnitude of said commutating potential in response to variations of the load transmitted by said apparatus.

13. In combination, a direct current circuit, an alternating current circuit, and means for transmitting energy therebeween under any desired power factor conditions on said alternating current circuit comprising an inductive winding in energy transmitting relation with respect to said alternating current circuit, means including a group of similarly disposed electric valves interconnecting said winding with one side of said direct current circuit, and a connection from the other side of said direct current circuit to said winding, means for controlling the conductivity of said valves, means for producing an alternating potential tending to vary in magnitude in accordance with the load transmitted by said apparatus to commutate the current between said valves against the electromotive force of said winding, and means responsive to the load transmitted by said apparatus for maintaining said commutating potential substantially constant in magnitude.

CLODIUS H. WILLIS.
CURTIS W. LAMPSON.